July 5, 1927.

W. C. STEVENS

TIRE STRIPPING MACHINE

Filed Dec. 19, 1921          7 Sheets-Sheet 6

1,634,920

Witness:
Fred C. Davison

Inventor:
William C. Stevens,
By G. L. Ely, Atty.

July 5, 1927.
W. C. STEVENS
TIRE STRIPPING MACHINE
Filed Dec. 19, 1921
1,634,920
7 Sheets-Sheet 7
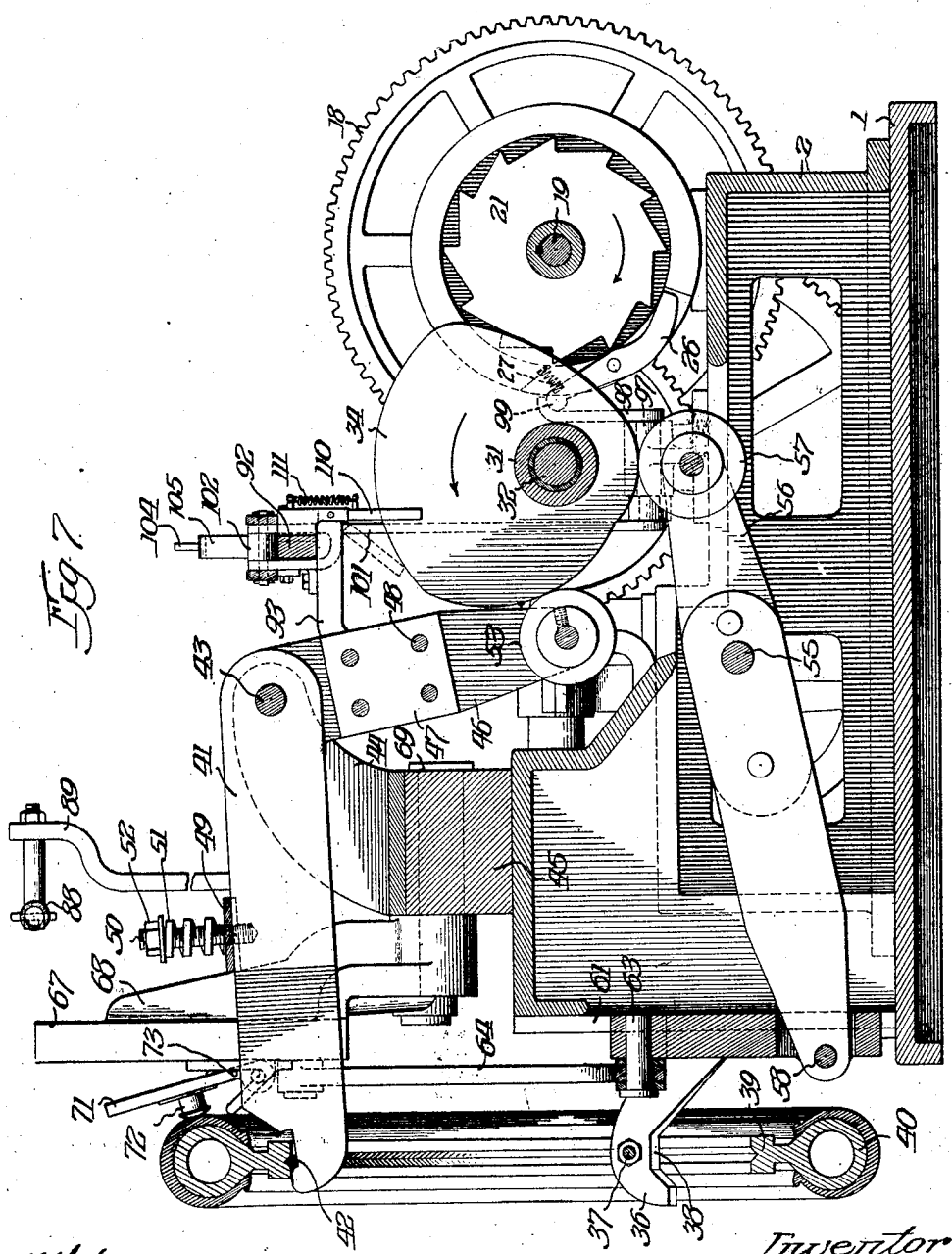

Patented July 5, 1927.

1,634,920

UNITED STATES PATENT OFFICE.

WILLIAM C. STEVENS, OF AKRON, OHIO, ASSIGNOR TO THE FIRESTONE TIRE AND RUBBER COMPANY, OF AKRON, OHIO, A CORPORATION OF OHIO.

TIRE-STRIPPING MACHINE.

Application filed December 19, 1921. Serial No. 523,420.

The object of the present invention is to improve upon prior forms of machines designed for stripping extensible bead or clincher tires from cores, it being the particular object of the present invention to substitute positive mechanical devices for operating the stripping arms such as in use in prior apparatus for this purpose, doing away with the fluid operated or air cylinder construction formerly in use.

The apparatus of the present invention is similar in many respects to that shown and described in my prior Patent No. 1,211,256 dated January 2, 1917, it being noted that for the several air cylinders required in the former tire stripping apparatus, there is here substituted a power operated device to move the several parts of the device which clamp the core and stretch and strip the tire therefrom.

In the drawings there is shown one embodiment of my invention such as to enable one skilled in the art to practise the same, but it will be understood that the showing is for that purpose only and is not to be understood as restricting the invention except within the limits of the claims attached hereto.

In the drawings:

Fig. 7 is a section on the line 7—7 of Fig. 5.

Figure 1:
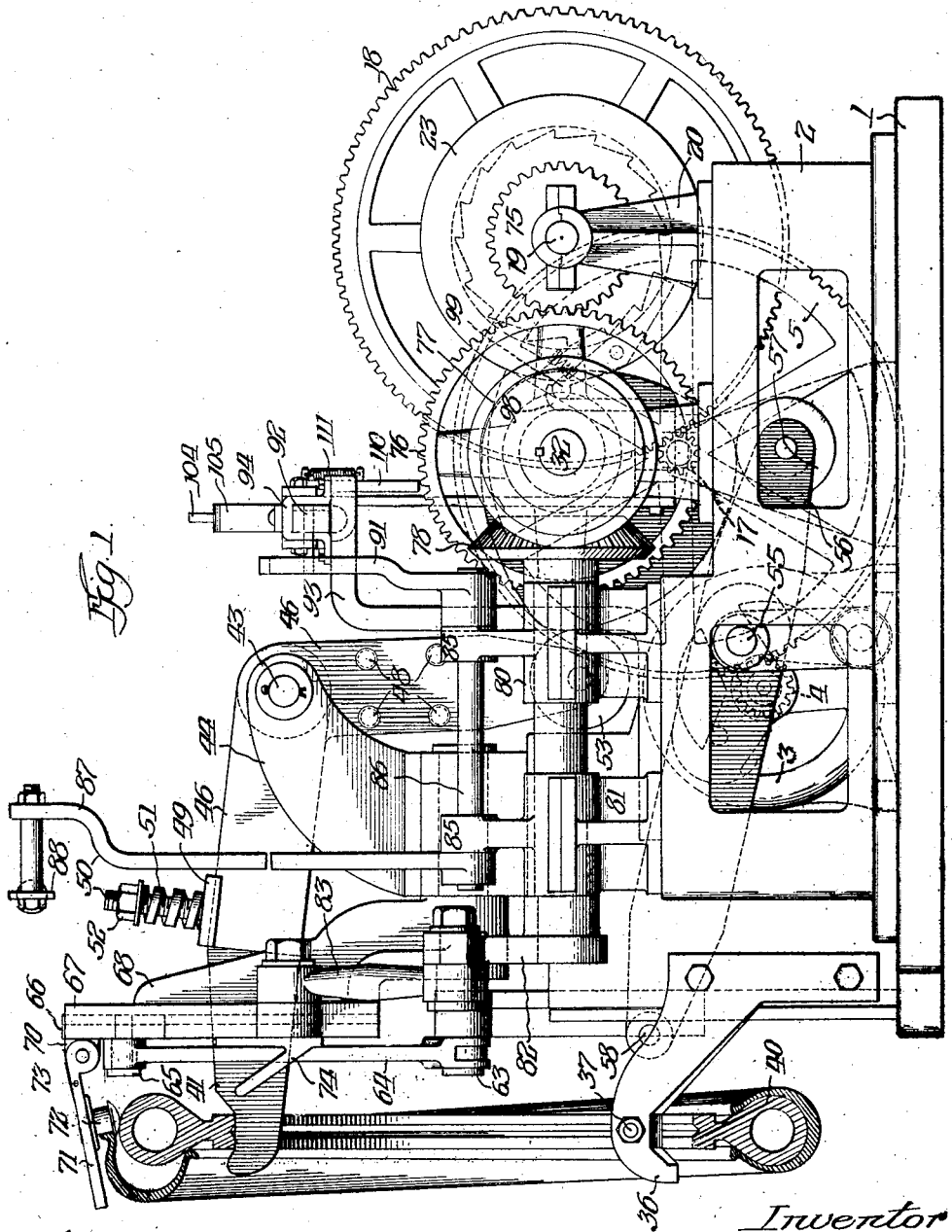
Fig. 1 is a side elevation of the machine, with the core clamped in position and the tire in the process of stripping.

The machine comprises a core clamping device which secures the core in position, and a pair of arms which carry tire engaging members, the arms being moved radially and then separated circumferentially about the core to stretch the bead and discharge the tire from the core. In these general principles it is similar to the machine of my prior patent.

The machine comprises a base plate 1, from which rises a platform or table 2, which supports the various moving elements of the machine. On a lateral extension of the base plate 1 is fastened the motor or prime mover 3, the pinion 4 of which meshes with a gear 5. The gear 5 is keyed to a sleeve 6 which is rotatably mounted in a bracket 7 attached to the base plate 1. On the opposite side of the bracket the sleeve is provided with a flange 8, in the face of which are formed notches 9. Against the face of the flange is placed one member 10 of any suitable clutch. The part 10 is provided with teeth, 11, received in the notches 9 and with a serrated or roughened face 12. A mating clutch member 13 is provided which has a roughened or saw-toothed face which engages with the clutch member 11, being held in yielding engagement therewith by a spring 14, confined by a nut or washer 15 on the end of drive shaft 16, which extends through the sleeve 6. The clutch member 13 is feathered on the shaft 16, and a pinion 17 is carried on its inner end. The mechanism which has just been described provides a yielding driving connection or safety device between the motor and the tire stripping machine, so that if any obstruction should be encountered, the driving mechanism will slip through the clutch and the machine or motor will not destroy itself.

The pinion 17 engages a large gear 18 which is fastened to end of a shaft 19 supported in brackets 20 rising from the rear of the platform 2.

Figure 5:
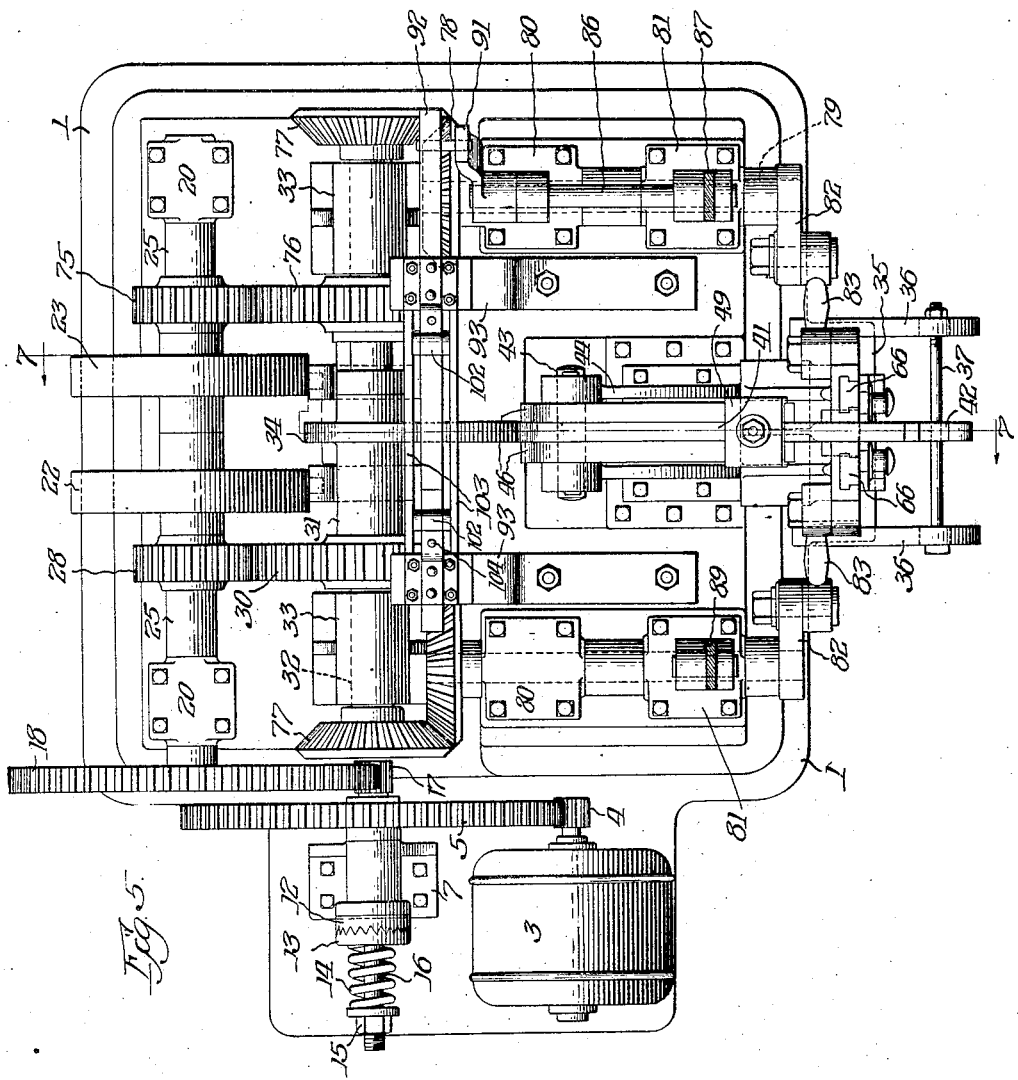
Fig. 5 is a plan view of the machine.
Figure 6:
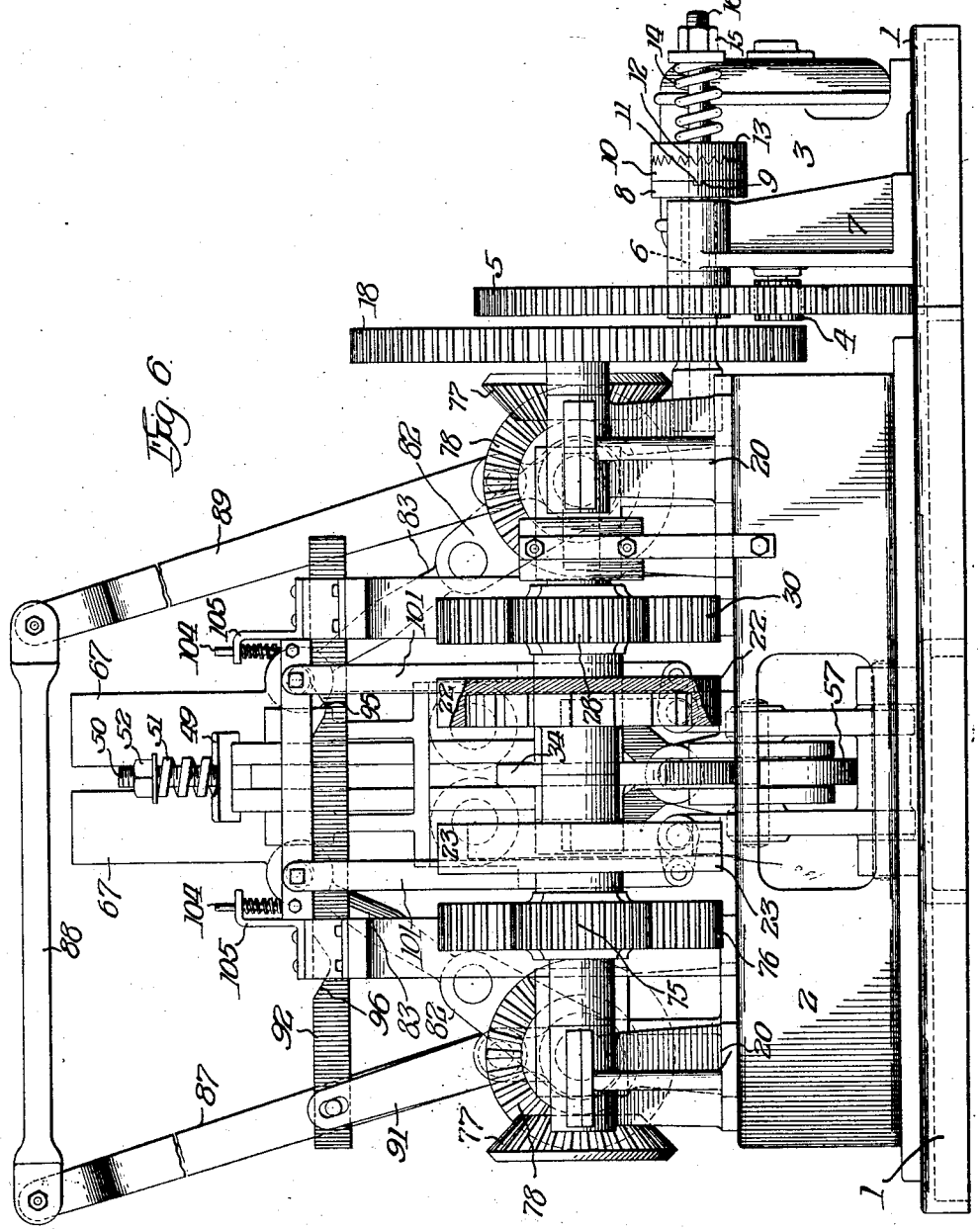
Fig. 6 is a rear elevation.

Keyed to points located centrally of the shaft 19 are two toothed wheels 21, which constitute the continuously rotating members of a one revolution clutch. There are two of the clutches, which for the sake of clearness will be given separate numerals 22 and 23 the left hand one as viewed in Fig. 5 being 22 and the right 23. The intermittently rotated member of each clutch is constituted in an annular disk 24 which fits over the wheel 21 being carried by a sleeve 25, rotatably mounted on the shaft 19. On the disk 24 is carried the usual pawl 26 which is actuated by a spring 27, so that when released in a manner to be later described, the rotating member 21 will be locked to the part 24 until the pawl is again raised, which occurs when the clutch has made one revolution. This is exemplary only of a well known type of single revolution clutch and other forms may be substituted.

A pinion 28 is carried on the sleeve 25 of clutch 22 and meshes with a larger gear 30, keyed to a long sleeve 31, which is rotatably mounted on a shaft 32 supported in brackets 33 rising from the platform 2. Formed integrally with the sleeve 31 is a cam 34 which operates the clamping mechanism for the core and also raises and holds the arms in elevated position during the stripping operation. This operation is most clearly shown in Fig. 7.

In the forward portion of the platform 2 is located an extension 35, to the sides of which are secured a pair of arms or stationary brackets 36 which are united and braced by a tie rod 37. The lower sides of the brackets are formed with recesses 38 which are designed to receive the lower portion of the tongue 39 of the tire core 40, serving as a portion of the clamping or supporting mechanism for the core. The core is clamped between the brackets 36 and the end of an arm 41 recessed at 42 for this purpose. The arm 41 is pivoted on a shaft 43 supported in brackets 44 which are secured to the top of a block 45 secured to the platform 2. Also pivoted on the shaft 43 between the brackets are two angular arms 46 connected on their vertical portions by a plate 47, and bolts 48. The horizontal portions of the arms 46 lie along the arm 41 and terminate at a point between the recess 42 and the shaft 43. Across the ends of the arms 46 is located an inverted channel plate 49 and secured to the arm 41 and passing through the said plate is a bolt 50. A spring 51 surrounds the bolt 50 and is confined by nut and washer 52. At their lower ends the arms 46 carry a roller 53 which bears against the cam 34.

When a core is placed in position and the cam 34 is rotated, the arms 46 are rocked outwardly which, through the medium of the yielding connection afforded by plate 49 and spring 51, raises the arm 41 which lifts the core and clamps it in position against the arms 36. The yielding connection which has been described allows for variations in the internal diameter of the tongue of the core, and furnishes a yielding clamping action for the core.

Across the platform 2 is mounted a shaft 55 on which is pivoted a lever 56, the rear end of which is bifurcated to support a roller 57 which bears against the cam 34 at a slightly advanced point from that occupied by the roller 53. The forward end of lever 56 passes through an aperture in the platform and carries a pin 58 which is rotatably mounted in bearing 59 on a slide 60. The slide 60 reciprocates, under the action of the cam 34, in vertical slideways 61 on the extension 35 of the platform, being confined by gibs or plates 62.

The upper end of slide 60 carries a pin 63 on which are pivotally mounted two arms 64, which normally extend vertically upward and are pivoted on pins 65 that extend from blocks or slides 66. Each block 66 is slidably mounted in a vertical guideway 67 formed in arms 68 that are mounted for oscillation on shafts 69 rotatably housed in the block 45 previously described.

Each slide 66 carries a lug 70 on which is loosely mounted a plate 71 at a midway point on which is mounted the flanged bead engaging roller 72. On each plate 71 is a pin 73 which is so located as to be receivable in a fork 74 attached to the guideway 67. This prevents the plate 71 from falling too far forward when the stripping machine is at rest and the upwardly extending ends of the plates rest against the side of the tire and prevent the rollers from passing so far forward as to engage the tongue of the core, and guide them in their upward movement so that they seat against the bead.

The operation of the cam 34 will now be understood. As it rotates in the direction of the arrow in Fig. 7 the clamping arm 41 is raised and the core clamped in position and held there during the continued rotation of the cam until the tire has been stripped as will be described. As the high portion of the cam reaches the roller 57 the stripping arms 64 are raised until they arrive at the position shown in Fig. 1 at which point the upper portion of the tire has been forced over the crown of the core. The rollers are held at the outward end of the arms 68 until the spreading action of the arms has taken place and until the arms are brought back to vertical position by the disconnection of the clutch 22.

It now becomes necessary to recite the mechanism by which the arms are oscillated or spread apart to complete the stripping of the tire. This action is accomplished through the second one revolution clutch 23.

This clutch is similar to clutch 22 and will not be described in detail, it being sufficient to state at the present time that it rotates through one revolution and stops. The driven member of the clutch 23 carries a pinion 75 which meshes with a gear 76 secured to the shaft 32 previously described. At the ends of the shaft 32 are secured two bevel pinions 77 which mesh with similar pinions 78 secured to the rear ends of shafts 79. The shafts 79 are each mounted on brackets 80 and 81 and carry at their forward ends crank arms 82, to the outer ends of which are attached links 83, pivoted at their outer ends in bosses 84 formed on the sides of guideways 67. It will be seen that as the clutch 23 is thrown into operative position the arms 67 will rotate about the shafts 69 until they are in the position shown in Fig. 4, whereupon the tire is completely stripped from the core.

In this connection it will be noted that the pinions 28 and 75 are preferably formed with one-half the number of teeth of the gears 30 and 76, so that at each revolution of the clutch the various parts actuated thereby will go to the extreme of their movement and will stop there until the clutch is again actuated, which will bring the several parts back to the positions at which they started.

The controlling devices for the clutches will now be described.

On the brackets 80 and 81 at one side of the machine, are formed aligned bearings 85 in which is mounted a shaft 86. At the forward end of the shaft 86 is secured a lever 87 which is connected by a rod 88 to a parallel lever 89, pivoted on a bearing 90 on the bracket 81 on the other side of the machine. The rod 88 constitutes an operating handle by which the clutches are operated.

The rear end of shaft 86 carries a lever 91, which has a pin and slot connection with a sliding control bar 92, slidably mounted on brackets 93 secured to the platform 2. Straps 94 confine the control bar. Notches 95 and 96 are cut in the upper surface of the control bar, the former being located nearly opposite the clutch 22 and operating the same, while the latter is adjacent the clutch 23 and operates it.

In brackets 97, which are attached to the platform 2 are rotatably mounted the shafts of clutch operating fingers 98; which fingers normally stand upright at the side of the clutches in position to engage the rounded ends 99 of the pawls 26, which connect the two portions of the clutch for driving relation. Each operating finger is provided with a crank arm 100 which is pivotally connected to a vertical rod 101 which extends up to the control bar at which point it is bifurcated and supports a roller 102 which rides over the upper surface of the control bar. There are two of these rollers and the upper ends of the rods 101 are connected by parallel links 103. The links are provided with pins 104 at each end which reciprocate in brackets 105 fastened on the arms 93. Springs 106 are located about the pins 104 and serve to press downwardly the links 103 and the rollers 102.

Figure 2:
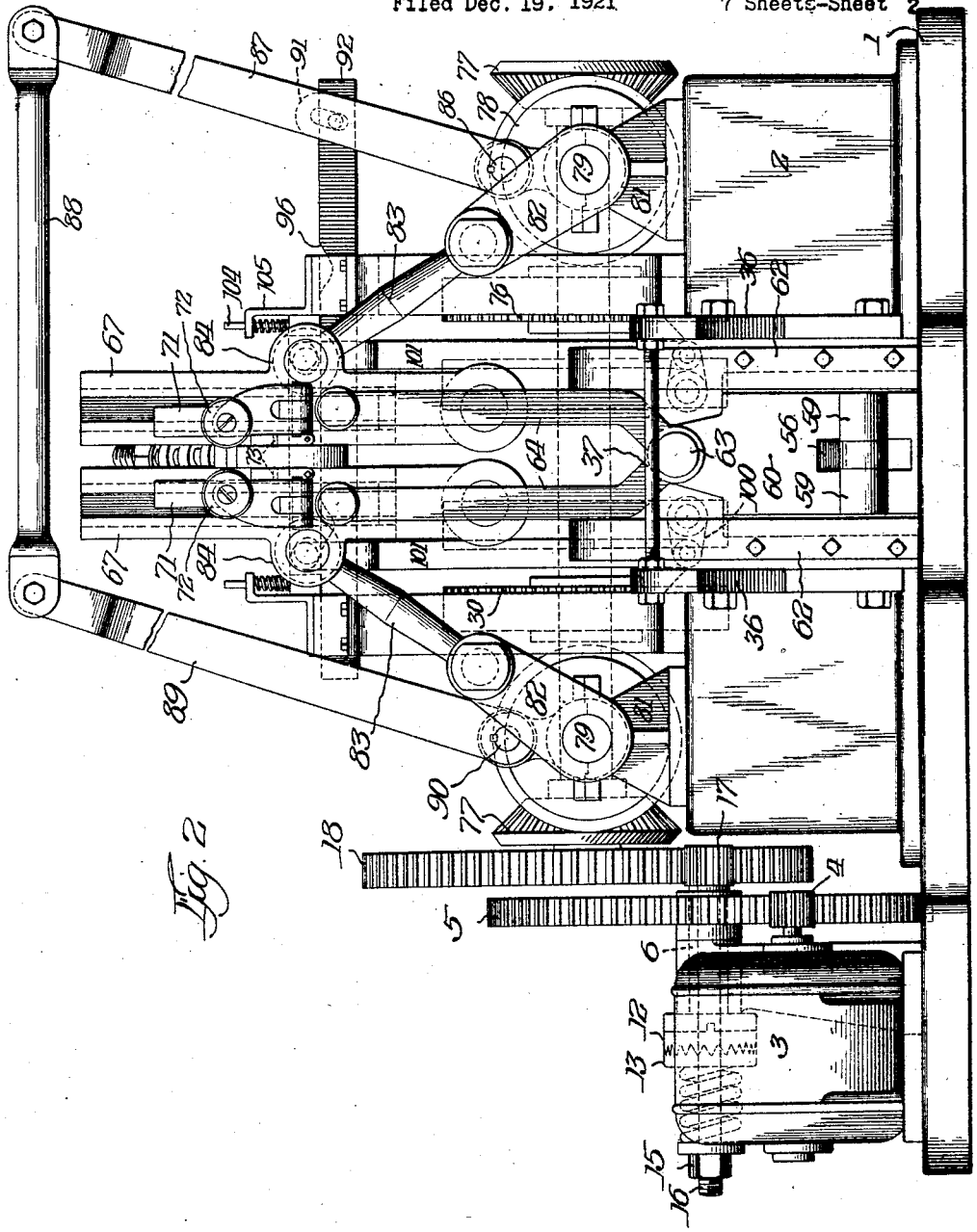
Fig. 2 is a front elevation with the stripping arms lowered in a position of rest.

It will be noted that the notches 95 and 96 are spaced apart further than the centers of the rollers 102. When the parts are in position shown in Fig. 2 with the stripping arms at a position of rest, the bar 88 is at the extreme right and both rollers 102 are out of the notches. In this position the fingers 98 are in the position shown in Fig. 7 with both clutches out of driving relation.

Figure 3:
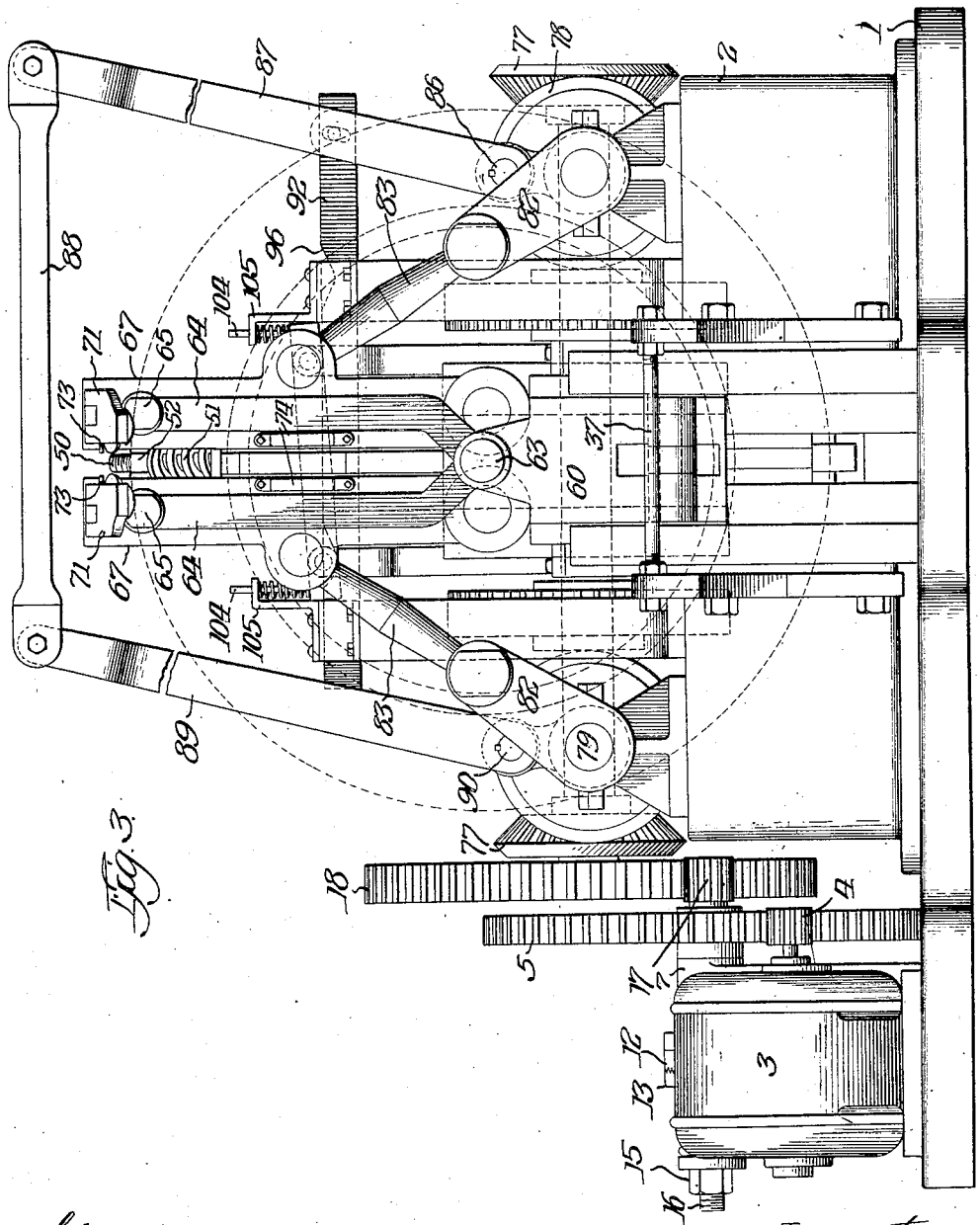
Fig. 3 is a similar view with the core, shown in dotted lines, clamped in position and the arms raised for the first portion of the stripping operation.

When the core is placed in front of the machine with the end of the arm 41 projecting through the core, the handle 88 is moved to the left until the roller 102 to the left drops in the notch 95, whereupon the clutch 22 is locked for rotation which revolves the cam 34, raising and clamping the core and raising the stripping arms to the position shown in Fig. 3.

The device is so constructed that the operator will move the handle 88 over to a point so that the left hand roller 102 is beyond the notch 95, whereby only a temporary release of the clutch operating finger will be obtained and the clutch upon making a complete revolution will stop. This will cause the cam shaft to make one half revolution and will hold the core in clamped position with the stripping arms raised.

In order to prevent a complete shifting of the handle 88 to the extreme left, which would cause the stripper arms to separate before they were fully raised and before the core was clamped in place, means are provided to stop the movement of the control bar until the first two operations, that of clamping the core and moving the arms radially, shall have been completed.

In the present embodiment this comprises a swinging arm or finger 110, held in vertical position by a spring 111, which arm is of sufficient length to strike the enlarged or high portion of the cam at the side and prevent further movement of the control bar to the left until the cam passes to the extreme of its clamping movement.

Figure 4:
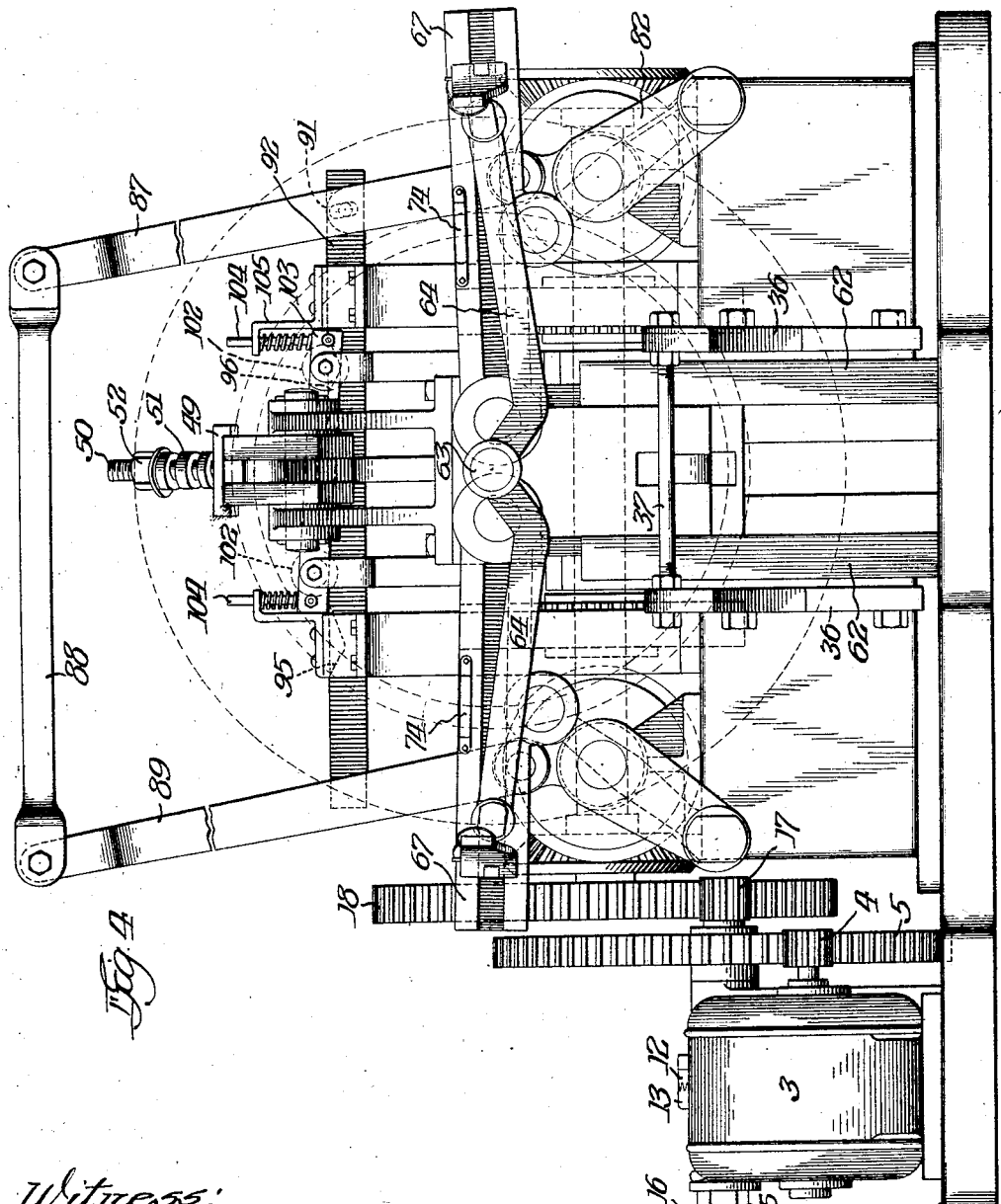
Fig. 4 is a similar view at the completion of the stripping operation.

When the cam has raised the core clamp and the stripping arms the control bar 92 may be passed over to the extreme left, so that the right hand roller 102 drops into the notch 96. This locks the clutch 23 for rotation which spreads the arms as shown in Fig. 4 and the tire is stripped. The rod 88 is now moved to the right which operates the clutches 23 and 22 in succession and the stripping arms return to their vertical position, are dropped to the position of rest and the core is lowered to the floor.

It will be seen from the description that has been given that there is provided a series of mechanical movements that are designed to replace the air cylinders used in the machine of my former patent. This is an improvement over my former invention in that positive driving devices are substituted for the fluid pressure, which was sometimes difficult to maintain and had some disadvantages. The machine is so arranged that it can be operated by unskilled labor and means are provided through the spring 51 and the clutch members 10 and 13 so that if an obstruction occurs the machine will give at the several parts and breakage will be avoided.

Changes and modifications may be made in reproducing this machine, but such changes and modifications as fall within the fair scope of the claims are intended to be covered herein.

Claims:

1. In a machine for stripping tires from cores, a rotating cam, means for clamping the core in position on the machine actuated by the cam and stripping arms to remove the tire from the core also actuated by the cam.

2. In a machine for stripping tires from cores, a rotating cam, means for clamping the core in position on the machine actuated by the cam, stripping arms movable radially of the core by the cam, and means to move the stripping arms about the core.

3. In a machine for stripping tires from cores, core clamping means, and tire stripping arms, and a single cam to actuate both the clamping means and the stripping arms.

4. In a machine for stripping tires from cores, a core clamping arm, and a tire stripping arm movable radially of the core, and a single cam to actuate said arms.

5. In a machine for stripping tires from cores, a pair of stationary core engaging arms, a movable core clamping arm, a device to engage the bead of a tire, movable radially of the core and a common actuating device for operating both the clamping arm and the bead engaging device.

6. In a machine of the character described, a plurality of arms movable radially of the core, means on said arms to engage the bead of a tire, pivots for said arms about which they oscillate circumferentially of the tire, means to move the arms simultaneously radially of the tire and a rotating power shaft, a second shaft, driving connections between the power shaft and the second shaft, means connected with the second shaft to move the arm about the core, and means to interrupt the connection between the two said shafts.

7. In a machine of the character described, a continuously rotating power shaft, a clutch on said power shaft, said clutch comprising a driving member and a driven member, a cam rotated from the driven member, a tire stripping arm movable over the core by the cam, and means to connect said clutch members for driving relation for a single operation of the cam.

8. In a machine of the character described, a continuously rotating power shaft, a clutch on said power shaft, said clutch comprising a driving member and a driven member, a plurality of tire stripping arms movable over the core and actuated by the driven member, and means to connect said clutch members for driving relation for a single movement of the tire stripping arms.

9. In a machine of the character described, a continuously rotating power shaft, and a plurality of tire stripping arms movable radially of the core, mechanically operated driving connections between the shaft and the tire stripping arms, means in said connections to render the same inoperative to move the stripping arms, said means being operable after a completion of stripping movement.

10. In a machine of the character described, a single power shaft, two clutches on said shaft, tire stripping arms, means to move said arms radially of the core and means to move them circumferentially of the core, one of said means being operable from one of said clutches and the other from the second clutch.

11. In a machine of the character set forth, a single power shaft, a clutch operated by said power shaft, tire stripping arms movable by the clutch radially of the core, a second clutch on said shaft and means operated by the second clutch to move the arms circumferentially of the core.

12. In a machine of the character set forth, a single power shaft, a clutch operated by said power shaft, core clamping means and radially movable tire stripping arms movable by the clutch, a second clutch to move the arms circumferentially of the core.

13. In a machine for stripping tires from cores, in combination, a fulcrumed lever for supporting and elevating a core, a pivoted arm movable in a fixed plane transversely of the core, devices upon the arm adapted to engage the tire, a fulcrumed lever for moving the arm, and rotary driving means common to both levers adapted to move them successively about their fulcrums.

14. In a machine for stripping tires from cores, in combination, a fulcrumed lever for supporting and elevating a core, a pivoted arm movable in a fixed plane transversely of the core, devices upon the arm for engaging the tire, a fulcrumed lever for moving the arm, and a rotary cam for successively moving both levers about their fulcrums.

15. In a machine for stripping tires from cores, in combination, a fulcrumed lever for supporting and elevating a core, an arm movable transversely of the core, a tire engaging roller mounted to swing on the arm, a fulcrumed lever for moving the arm, and driving mechanism common to both levers for successively moving them about their fulcrums.

16. In a machine for stripping tires from cores, a fulcrumed lever for supporting and elevating a core, a tire stripping arm movable transversely of the core and circumferentially thereof, a fulcrumed lever for moving the arm transversely of the core, a rotary cam for successively moving the levers about their fulcrums, a crank for moving the arm circumferentially, and driving means for actuating the cam and crank.

WILLIAM C. STEVENS.